US008817923B2

(12) United States Patent
Kawai et al.

(10) Patent No.: US 8,817,923 B2
(45) Date of Patent: Aug. 26, 2014

(54) DIGITAL BROADCAST RECEIVER

(75) Inventors: Takanori Kawai, Tokyo (JP); Hiroyuki Nagahama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 71 days.

(21) Appl. No.: 13/634,127

(22) PCT Filed: Jun. 2, 2010

(86) PCT No.: PCT/JP2010/003683
§ 371 (c)(1),
(2), (4) Date: Sep. 11, 2012

(87) PCT Pub. No.: WO2011/151860
PCT Pub. Date: Dec. 8, 2011

(65) Prior Publication Data
US 2013/0003902 A1 Jan. 3, 2013

(51) Int. Cl.
*H04L 27/08* (2006.01)

(52) U.S. Cl.
USPC ........ 375/345; 375/316; 455/127.2; 455/219; 455/232.1; 455/234.1; 348/378; 348/731; 725/100; 725/131; 725/151

(58) Field of Classification Search
CPC ............. H03G 3/52; H03G 3/78; H03G 3/89; H03G 3/3068; H04N 5/50; H04N 5/52; H04N 5/4401; H04L 27/3809; H04B 1/109

USPC ............ 375/316, 345; 455/127.2, 219, 232.1, 455/234.1; 348/378, 731; 725/100, 131, 725/151
See application file for complete search history.

(56) References Cited

U.S. PATENT DOCUMENTS

| | | | | |
|---|---|---|---|---|
| 5,940,143 | A | * | 8/1999 | Igarashi et al. ................ 348/678 |
| 5,999,559 | A | * | 12/1999 | Takaki ............................ 375/130 |
| 6,242,981 | B1 | | 6/2001 | Tomiyama |
| 2006/0164563 | A1 | * | 7/2006 | Watanabe et al. .............. 348/731 |

FOREIGN PATENT DOCUMENTS

| | | |
|---|---|---|
| JP | 08-116468 A | 5/1996 |
| JP | 2000-151442 A | 5/2000 |
| JP | 2004-364124 A | 12/2004 |
| JP | 2005-033247 A | 2/2005 |
| JP | 2005-130076 A | 5/2005 |
| JP | 2006-148521 A | 6/2006 |
| JP | 2006-527962 A | 12/2006 |
| JP | 2009-130798 A | 6/2009 |
| JP | 2010-045652 A | 2/2010 |
| WO | WO 2004/112384 A2 | 12/2004 |
| WO | WO 2005/004341 A1 | 1/2005 |

* cited by examiner

*Primary Examiner* — Leon Flores
(74) *Attorney, Agent, or Firm* — Birch, Stewart, Kolasch & Birch, LLP

(57) ABSTRACT

When a decision is made that receiving performance deterioration due to an interfering wave is present in a digital broadcasting wave, an operating point of an RF AGC amplifier 6 and a time constant of gain control of the RF AGC amplifier 6 are altered.

5 Claims, 15 Drawing Sheets

(a)

AGC Operation (Normal)

(b)

Antenna Receiving Signal (c)

Signal after RF AGC (a)

AGC Operation (When RF AGC Operating Point is Varied)

(b)

Antenna Receiving Signal (c)

Signal after RF AGC (a)

(b)

DIGITAL BROADCAST RECEIVER

TECHNICAL FIELD

The present invention relates to a digital broadcast receiver used for an onboard digital audio apparatus or the like for receiving a digital broadcasting wave.

BACKGROUND ART

As a prior art relating to the present invention, there is a digital broadcast receiver disclosed in Patent Document 1. To improve receiving performance by reducing influence of adjacent interfering waves on a digital broadcasting wave, the digital broadcast receiver alters a delay point which is a switching point in the automatic gain control between the automatic gain control of the RF (Radio Frequency) band and the automatic gain control of the IF (Intermediate Frequency) band.

When there is an interfering wave other than a channel through which a digital broadcasting wave (desired wave) is transmitted, there are some cases where a desired signal cannot be received normally because of suppression of the received level of the desired wave owing to the automatic gain control of the RF band. To solve the problem, a conventional technique such as that disclosed in the Patent Document 1 decides deterioration in receiving performance due to the interfering wave from the automatic gain control of the RF band, the automatic gain control of the IF band, a result of an FFT (Fast Fourier Transform), a C/N (Carrier to Noise) value and the number of errors, and alters the operating point of the automatic gain control amplifier of the RF band when confirming the deterioration in the receiving performance due to the interfering wave. The operation can reduce the suppression of the received level of the desired wave due to the automatic gain control of the RF band, thereby making it possible to receive the desired signal.

However, merely altering the operating point of the automatic gain control amplifier of the RF band is not enough and has a problem in that if the received signal of the digital broadcasting wave is influenced by fading and its received level varies, a post-stage circuit is liable to saturate.

The present invention is implemented to solve the foregoing problems. Therefore it is an object of the present invention to provide a digital broadcast receiver capable of reducing the deterioration in the receiving performance due to an interfering wave and fading by altering a time constant of automatic gain control of each of the RF band and IF band simultaneously with the alteration of the operating point of the automatic gain control amplifier of the RF band.

PRIOR ART DOCUMENT

Patent Document

Patent Document 1: Japanese Patent Laid-Open No. 2006-527962.

DISCLOSURE OF THE INVENTION

A digital broadcast receiver in accordance with embodiments of the present invention comprises: an RF-AGC amplifier unit for amplifying, with its gain being controlling, an RF signal in a desired frequency band extracted from IF signals of a digital broadcasting wave; a frequency converter unit for carrying out frequency conversion of an output signal of the RF-AGC amplifier unit to an IF signal in a desired intermediate frequency band; an IF-AGC amplifier unit for amplifying, with its gain being controlling, the IF signal passing through the frequency conversion by the frequency converter unit; a detecting unit for detecting an interfering wave in the digital broadcasting wave; an information acquiring unit for acquiring information indicating a receiving state of the digital broadcasting wave; a decision unit for deciding, when the detecting unit detects the interfering wave, the presence or absence of receiving performance deterioration in the digital broadcasting wave due to the interfering wave from the information supplied from the information acquiring unit; and a control unit for altering, when the decision unit decides that the receiving performance deterioration of the digital broadcasting wave is present, an operating point of the RF-AGC amplifier unit and a time constant of gain control in the RF-AGC amplifier unit, wherein altering the operating point reduces the receiving performance deterioration due to the interfering wave, and altering the time constant reduces the receiving performance deterioration due to fading.

According to an aspect of embodiments of the present invention, when a decision is made that the receiving performance deterioration due to the interfering wave is present in the digital broadcasting wave, it alters the operating point of the RF-AGC amplifier unit and the time constant of the gain control in the RF-AGC in the receiving performance due to the interfering wave and fading.

EMBODIMENTS FOR CARRYING OUT THE INVENTION

The best mode for carrying out the invention will now be described with reference to the accompanying drawings to explain the present invention in more detail.

Embodiment 1

Figure 1:
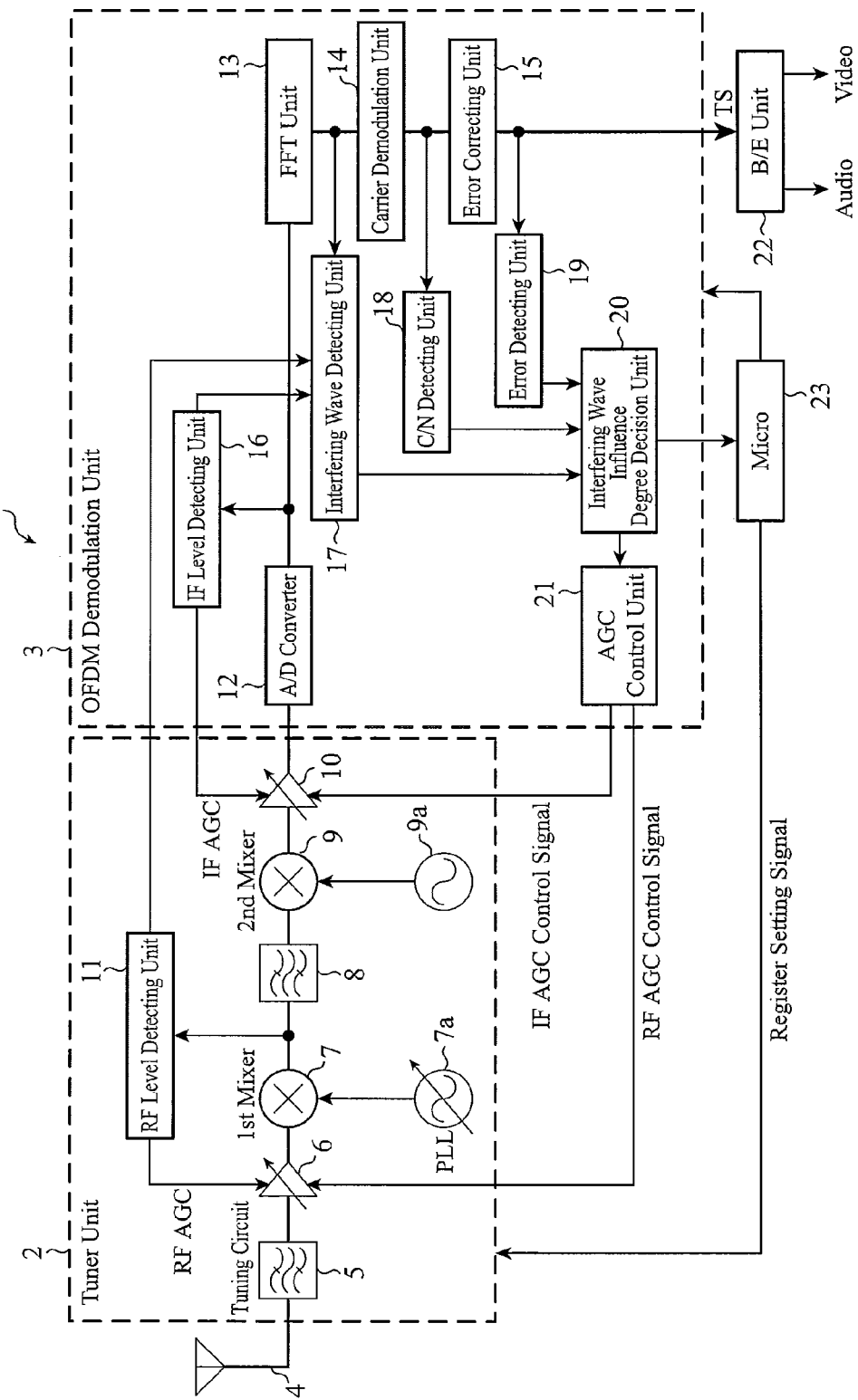
FIG. 1 is a block diagram showing a configuration of a digital broadcast receiver of an embodiment 1 in accordance with the present invention.

FIG. 1 is a block diagram showing a configuration of a digital broadcast receiver of an embodiment 1 in accordance with the present invention. As shown in FIG. 1, the digital broadcast receiver 1 of the embodiment 1 comprises a tuner unit 2 and an OFDM (Orthogonal Frequency Division Multiplexing) demodulation unit 3, and receives a digital broadcasting wave via an antenna 4.

The digital broadcasting wave received with the antenna 4 is supplied to the tuner unit 2 as an RF signal, and a tuning circuit 5 extracts a signal in a desired frequency band. Next, an amplifier for automatic gain control of the RF band (abbreviated to RF AGC from now on) (RF-AGC amplifier unit) 6 alters its gain in response to the RF AGC control signal from an AGC control unit 21, thereby adjusting the level of the signal extracted by the tuning circuit 5.

A first frequency converter unit (referred to as "1st Mixer" from now on) (frequency converter unit) 7 carries out frequency conversion of the output signal of the RF AGC amplifier 6 to an IF signal with a prescribed intermediate frequency by mixing it with a local oscillation frequency set via a PLL (Phase Locked Loop) circuit unit 7a. An intermediate frequency filter 8 removes an interfering wave through band limitation of the IF signal passing through the frequency conversion by the 1st Mixer 7.

Subsequently, a second frequency converter unit (referred to as "2nd Mixer" from now on) (frequency converter unit) 9 mixes the IF signal with a local oscillation frequency fed from the reference local oscillator 9a, thereby carrying out frequency conversion to the IF signal with an intermediate frequency the OFDM demodulation unit 3 desires. After that, an amplifier for the automatic gain control of the IF band (abbreviated to IF AGC from now on) (IF-AGC amplifier unit) 10 alters its gain in response to the IF AGC control signal from the AGC control unit 21, thereby adjusting the level of the IF signal passing through the frequency conversion of the 2nd Mixer 9 and supplying to the OFDM demodulation unit 3.

In the OFDM demodulation unit 3, the IF signal fed from the tuner unit 2 is converted from the analog signal to the digital signal through an A/D converter 12 and then is subjected to FFT processing by an FFT unit 13. Next, a carrier demodulation unit 14 performs carrier demodulation of the signal passing through the FFT processing, and an error correcting unit 15 carries out error correction of the output of the carrier demodulation unit 14, thereby obtaining a transport stream signal (referred to as "TS signal" from now on). A B/E unit 22 carries out TS demodulation of the TS signal fed via the error correcting unit 15, and outputs video and audio signals.

Here, the problem of the conventional apparatus will be described in more detail to make the characteristics of the present invention clearer.

In the conventional digital broadcast receiver, an interfering wave detecting unit (detecting unit) 17 shown in FIG. 1 detects an interfering wave from a signal level detection result of the RF level detecting unit 11 of the tuner unit 2 and a signal level detection result of an IF level detecting unit 16 of the OFDM demodulation unit 3, or from a result of the FFT processing by the FFT unit 13. In addition, an interfering wave influence degree decision unit (decision unit) 20 decides the deterioration in the receiving performance due to an interfering wave from a detection result of the interfering wave by the interfering wave detecting unit 17 and from detection results of a C/N detecting unit (information acquiring unit) 18 and of an error detecting unit (information acquiring unit) 19.

Figure 2:
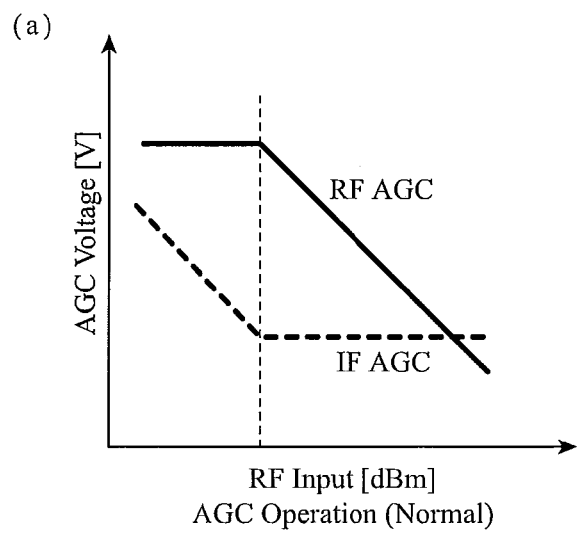
FIG. 2 is a diagram showing AGC operation in normal times, and frequency characteristics of an antenna receiving signal and of a signal after passing through an RF AGC amplifier.
Figure 2:
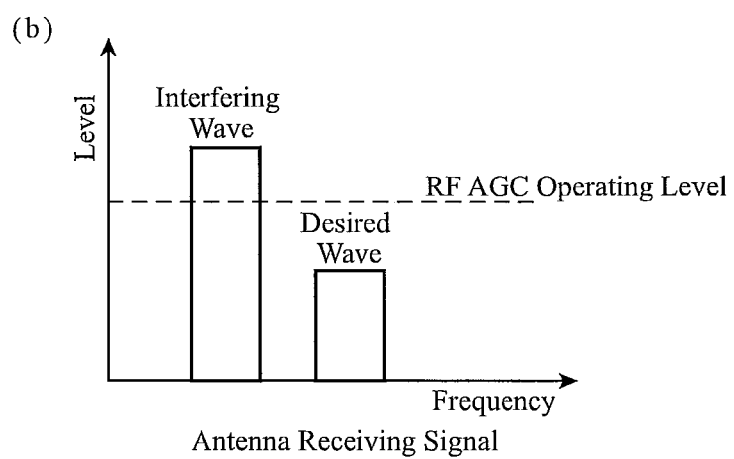
Figure 2:
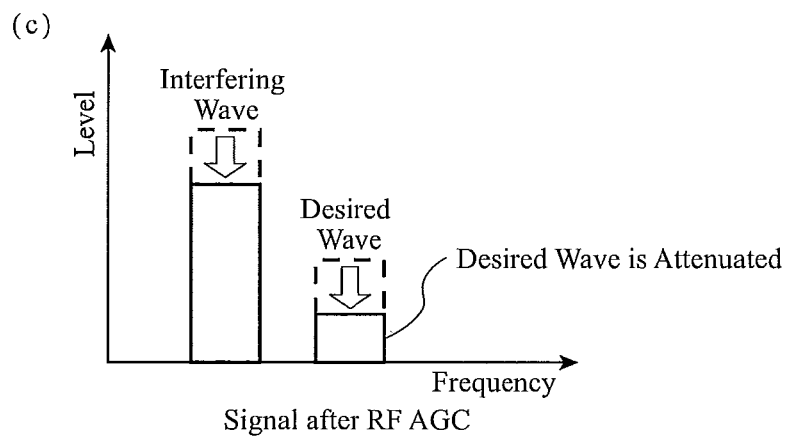

FIG. 2 is a diagram showing AGC operation in normal times, and frequency characteristics of an antenna receiving signal and of a signal after passing through the RF AGC amplifier. Here, FIG. 2(a) is a graph showing operation of the AGC amplifiers 6 and 10 in normal times, in which the horizontal axis shows an input signal level (dB) and the vertical axis shows AGC voltage (V). In addition, FIG. 2(b) is a graph showing frequency characteristics of the antenna receiving signal received with the antenna 4, and FIG. 2(c) is a graph showing frequency characteristics of the output signal of the RF AGC amplifier 6, in which each horizontal axis shows frequency and vertical axis shows a signal level.

As shown by a thick line in FIG. 2(a), the RF AGC amplifier 6 keeps the gain at a prescribed AGC voltage for the input signal not greater than a prescribed AGC operation level (operating point), but reduces for the input signal greater than the prescribed AGC operation level its gain as its level increases. Accordingly, as shown in FIG. 2(b), when the level of an interfering wave included in the antenna receiving signal is greater than the RF AGC operation level (operating point), the RF AGC amplifier 6 reduces the gain of the antenna receiving signal including the interfering wave as shown in FIG. 2(c), thereby attenuating the desired wave simultaneously with the interfering wave. This may sometimes disable receiving the desired signal.

To solve such a problem, the microcomputer (referred to as micro from now on) (control unit) 23 alters the operating point of the RF AGC amplifier 6 when the interfering wave influence degree decision unit 20 confirms deterioration in the receiving state caused by the interfering wave.

Specifically, the micro 23 increases the AGC operation level by controlling the RF AGC amplifier 6 in response to the RF AGC control signal, thereby reducing the attenuation of the desired wave.

Figure 3:
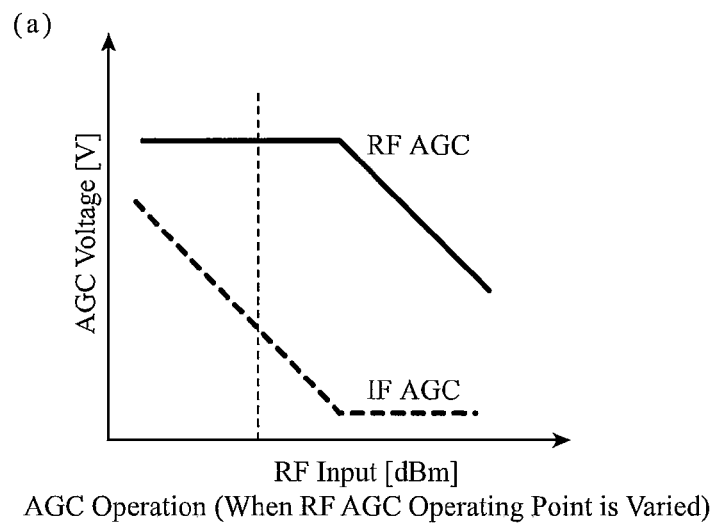
FIG. 3 is a diagram showing AGC operation when altering the operating point of an RF AGC amplifier, and frequency characteristics of the antenna receiving signal and of the signal after passing through the RF AGC amplifier.
Figure 3:
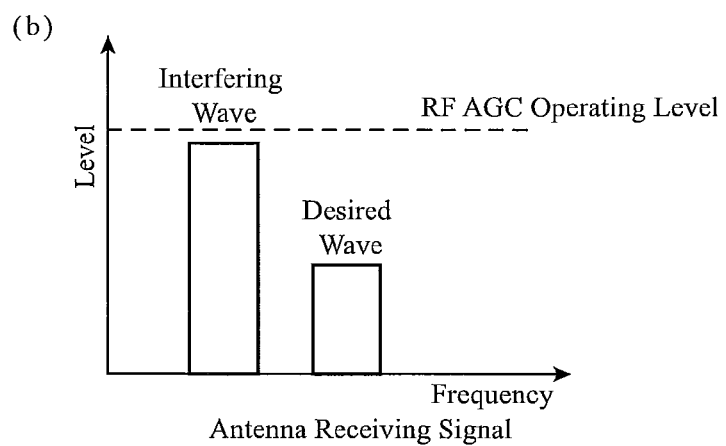
Figure 3:
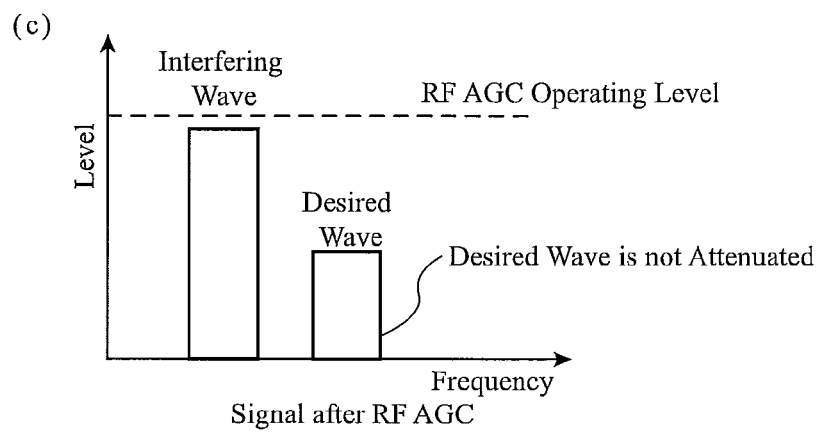

FIG. 3 is a diagram showing the AGC operation when altering the operating point of the RF AGC amplifier, and frequency characteristics of the antenna receiving signal and of the signal after passing through the RF AGC amplifier. Here, FIG. 3(a) is a graph showing the operation of the AGC amplifiers 6 and 10 when altering the operating point of the RF AGC amplifier 6, in which the horizontal axis shows an input signal level (dB) and the vertical axis shows AGC voltage (V). In addition, FIG. 3(b) is a graph showing frequency characteristics of the antenna receiving signal received with the antenna 4, and FIG. 3(c) is a graph showing frequency characteristics of the output signal of the RF AGC amplifier 6, in which each horizontal axis shows frequency and vertical axis shows the signal level as in FIG. 2(a).

As shown in FIG. 3(a) and FIG. 3(b), increasing the RF AGC operation level (the operating point of the RF AGC amplifier 6) reduces the attenuation of the desired wave in the signal after passing through the RF AGC amplifier 6 as shown in FIG. 3(c). This enables the RFAGC amplifier 6 to reduce its suppression effect on the desired wave, thereby making it possible to receive the desired signal.

However, merely altering the operating point of the RF AGC amplifier 6 is not enough, and has another problem in that the post-stage circuit is liable to saturate because of signal level fluctuations due to fading.

Figure 4:
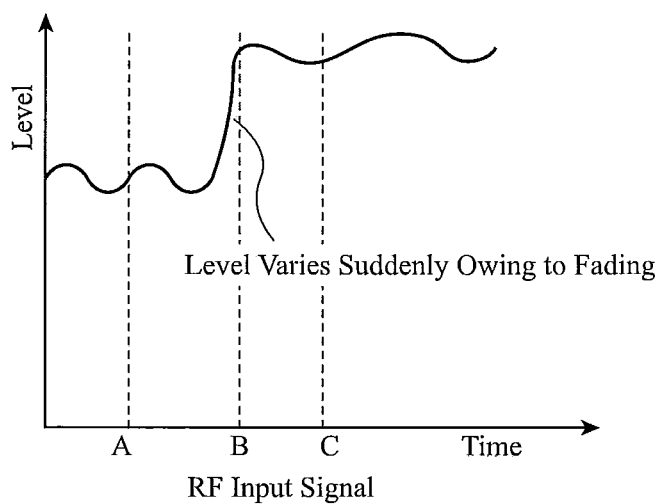
FIG. 4 is a diagram showing signal level variations due to fading.
Figure 4:
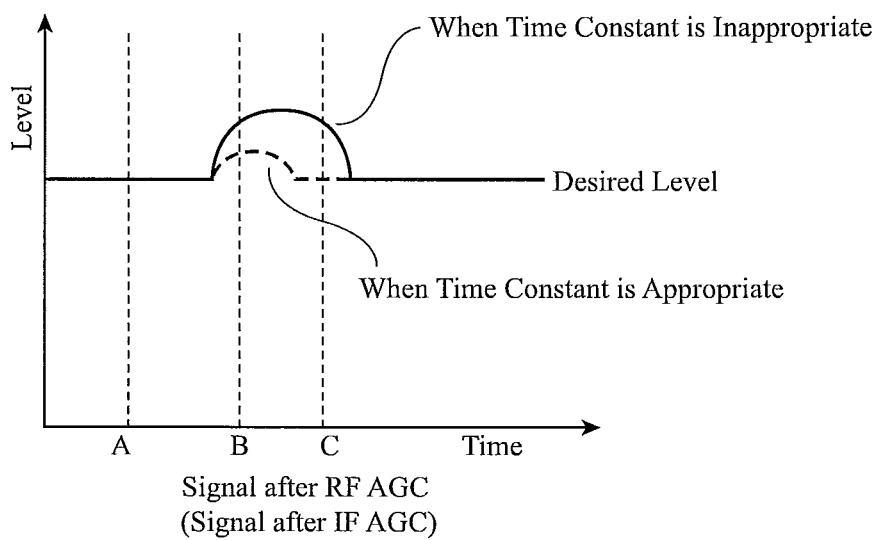

FIG. 4 is a diagram showing signal level variations due to fading, in which FIG. 4(a) shows time variations in the level of the RF signal which is the antenna receiving signal, and FIG. 4(b) shows time variations of the signal after passing through the RF AGC amplifier.

FIG. 4(a) shows a case where fading occurs at time B at which the signal level varies (increases) suddenly. In this case, as shown in FIG. 4(b), if the time constant of the RF AGC is inappropriate, the time, during which the signal passing through the RF AGC amplifier 6 returns to a desired level the post-stage circuit can handle, extends as compared with the case where the time constant is appropriate.

Incidentally, as the caption in parentheses in FIG. 4 shows, the IF AGC amplifier 10 exhibits the same behavior.

Figure 5:
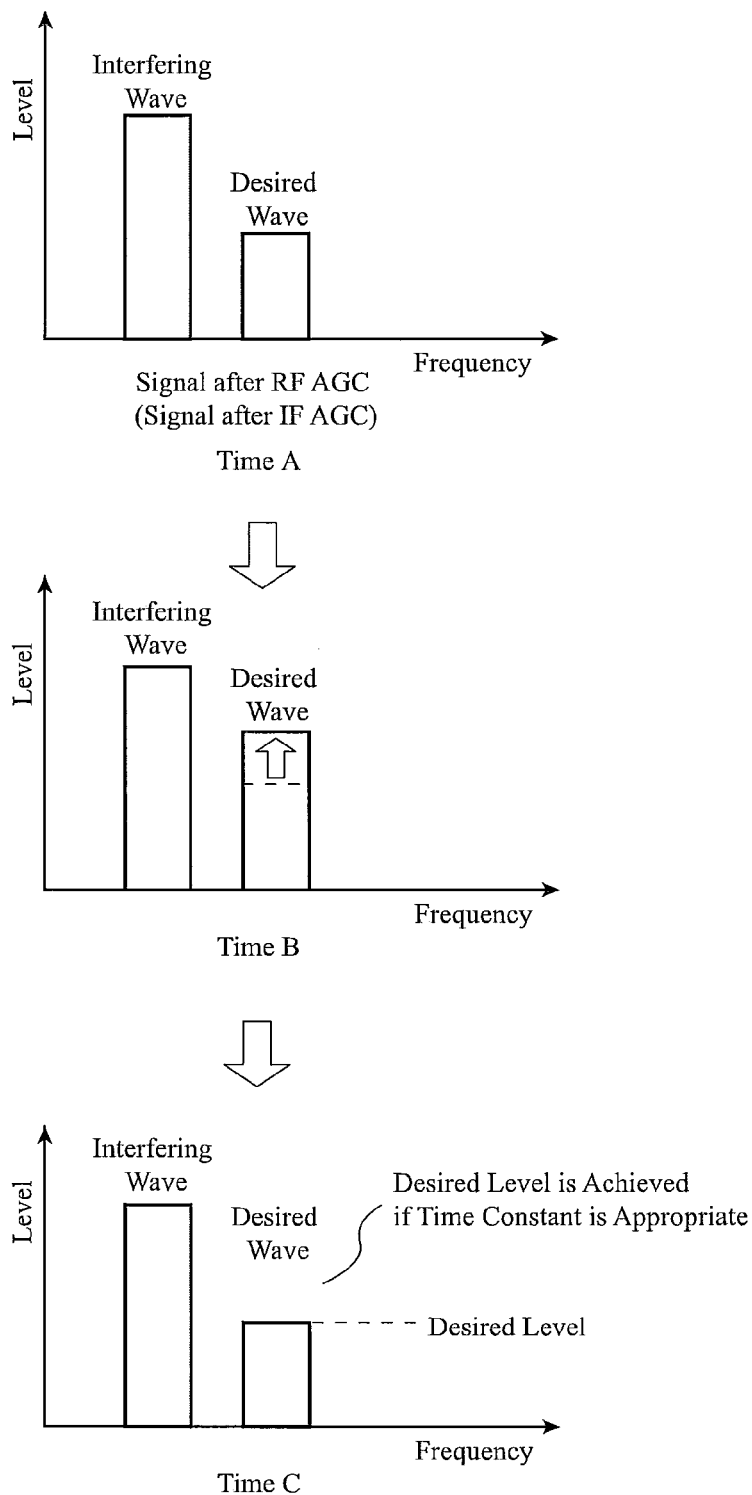
FIG. 5 is a diagram showing frequency characteristics of the signal after passing through the AGC amplifier when the time constant of the AGC is appropriate.
Figure 6:
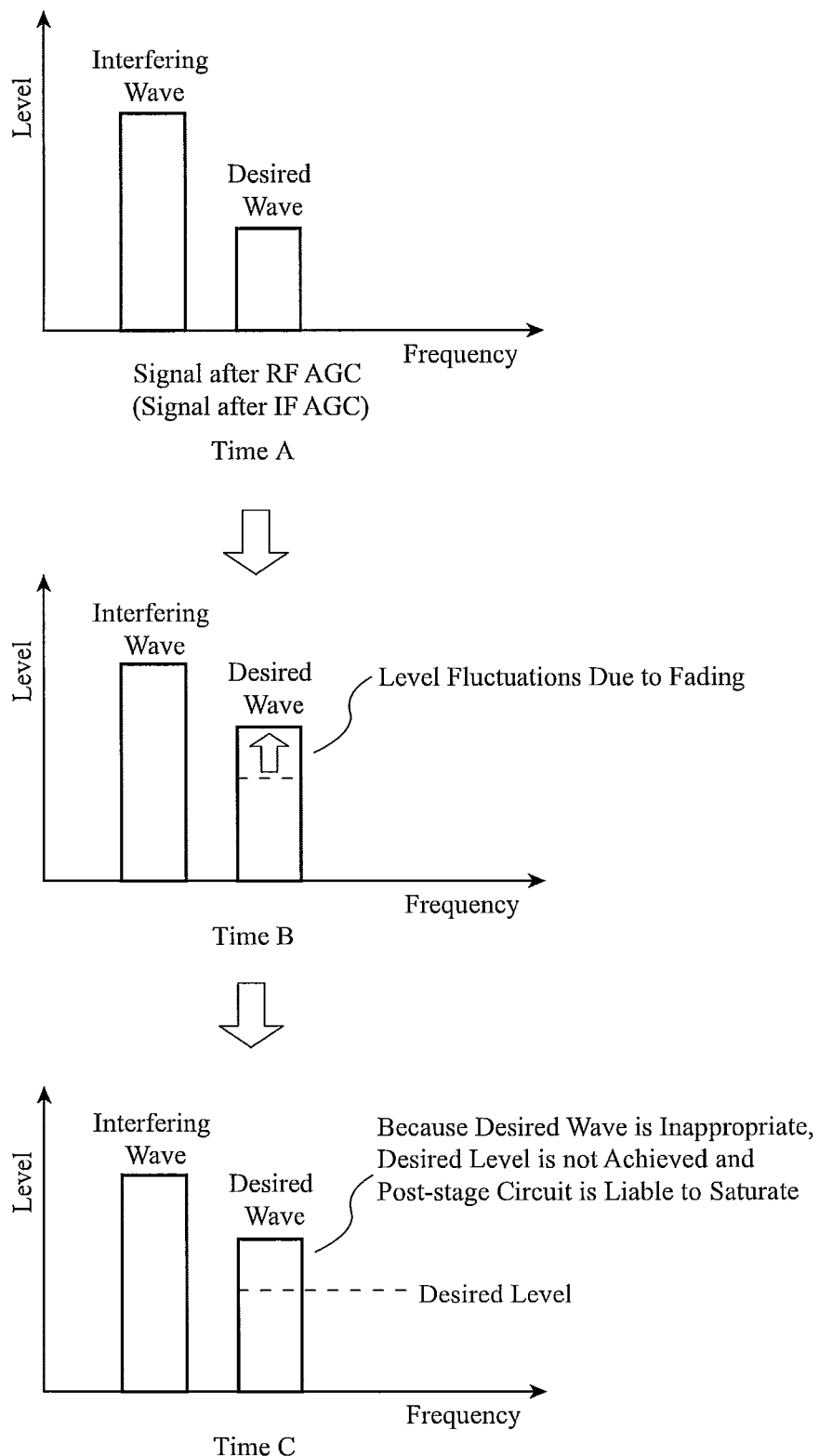
FIG. 6 is a diagram showing frequency characteristics of the signal after passing through the AGC amplifier when the time constant of the AGC is inappropriate.

As shown in FIG. 5, when the time constant of the AGC is appropriate, even if the signal level of the desired wave suddenly increased at time B because of the fading, since it returns to the desired level the post-stage circuit can handle at time C, this offers no problem at all.

In contrast, if the time constant of the AGC is inappropriate, the signal level of the desired wave suddenly increased at time B because of the fading holds a level above the desired level even at time C, and is supplied to the post-stage circuit. Accordingly, the post-stage circuit is liable to saturate.

Then, in the digital broadcast receiver 1 of the embodiment 1, when the interfering wave influence degree decision unit 20 confirms the deterioration in the receiving state due to the interfering wave, it alters the operating point of the RF AGC amplifier 6 and alters at the same time the time constants of the AGC of the RF and IF. This will enable reducing the performance deterioration due to the interfering wave and fading.

Incidentally, in the case where the signal level fluctuates owing to fading, a state, in which the signal passing through the AGC amplifier returns to the desired level the post-stage circuit can handle, has "attack" and "release".

Figure 7:
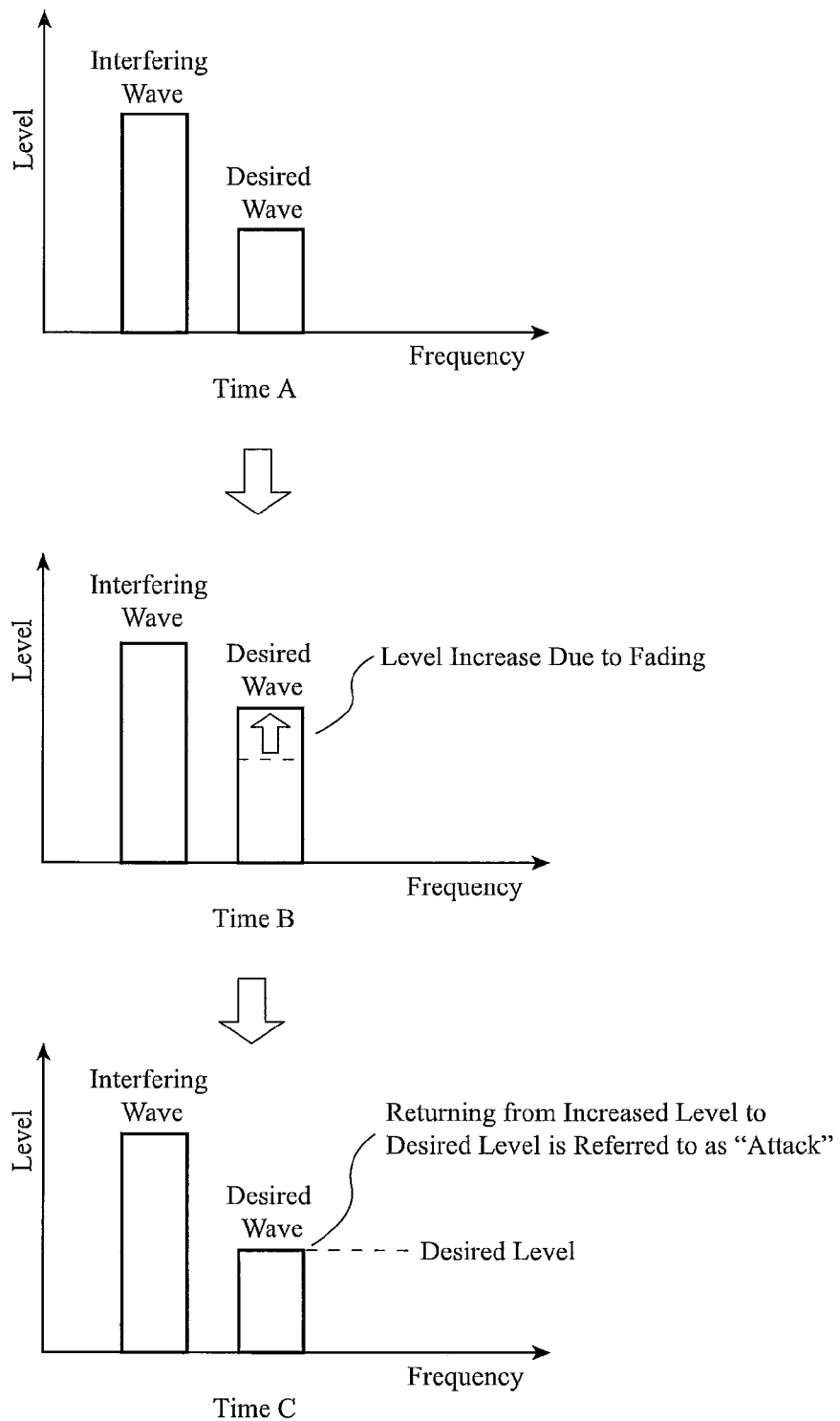
FIG. 7 is a diagram illustrating attack.

FIG. 7 is a diagram illustrating attack, which shows frequency characteristics of the signal after passing through the AGC, in which it is assumed that time passes by in the order of time A, time B and time C. As shown in FIG. 7, the state is referred to as "attack" during which the signal level of the desired wave that suddenly increases at time B owing to fading returns to the desired level from the level increase at time C.

Figure 8:
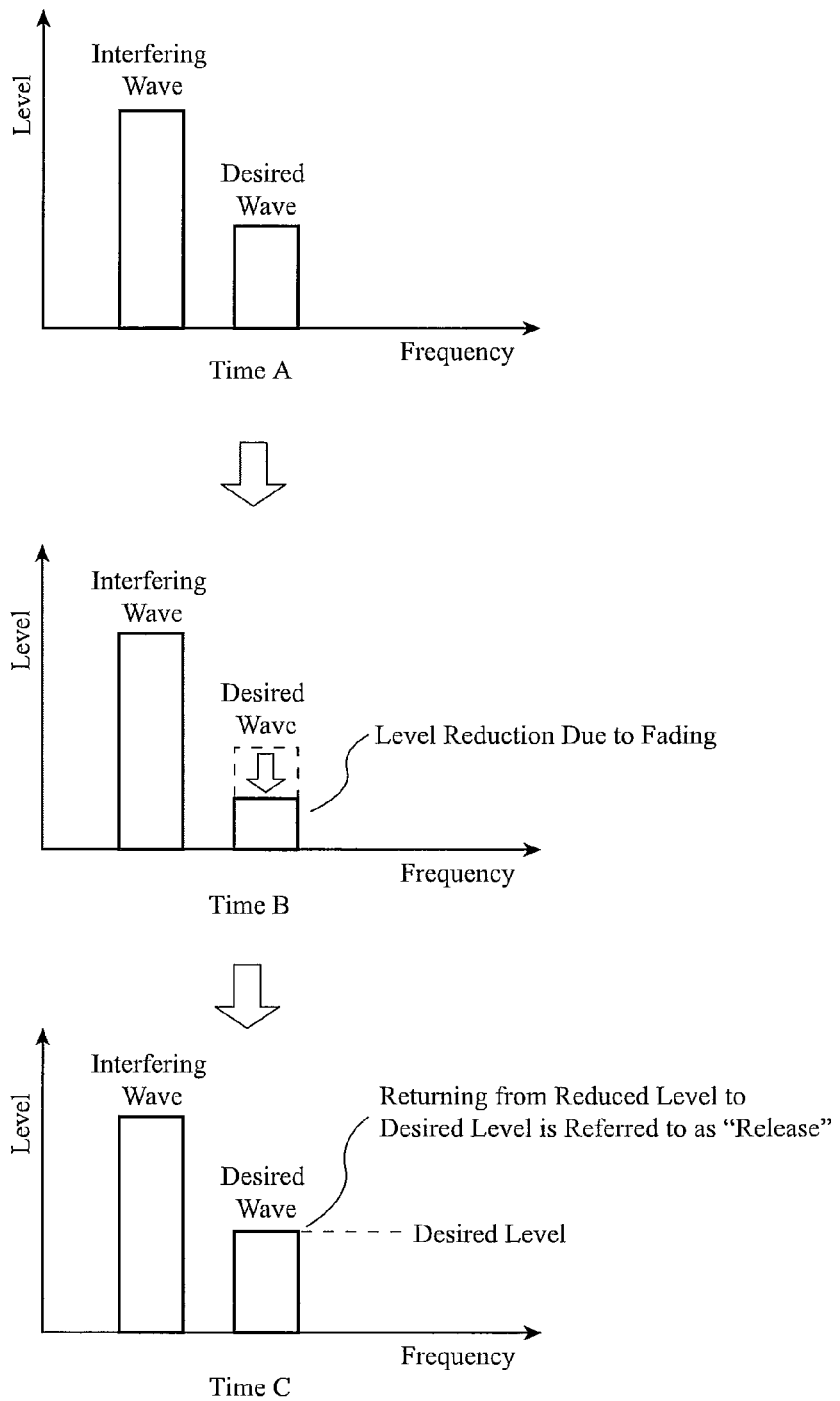
FIG. 8 is a diagram illustrating release.

FIG. 8 is a diagram illustrating release, which shows frequency characteristics of the signal after passing through the AGC, in which the time passes by in the order of time A, time B and time C as in FIG. 7. As shown in FIG. 8, the state is referred to as "release" during which the signal level of the desired wave suddenly reduces at time B owing to fading returns to the desired level from the level reduction at time C.

The micro 23 varies the individual time constants of the AGC of the RF and IF at the attack and release separately. As an altering method of the time constant of the AGC, it is conceivable to alter the value in an internal register (not shown in FIG. 1) that holds the time constant that determines the responsiveness of the AGC in the tuner unit 2 by a register set signal from the micro 23. Alternatively, a configuration is also possible in which the AGC control unit 21 of the OFDM demodulation unit 3 alters the time constant of the AGC by the control using the AGC control signal.

Next, the operation will be described.

Here, the control will be described of the operating point of the RF AGC amplifier 6 and of the individual time constants of the AGC of the RF and IF.

Figure 9:
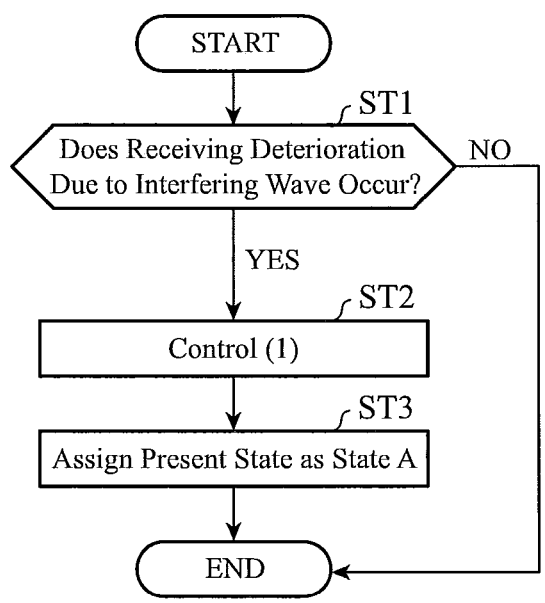
FIG. 9 is a flowchart showing a flow of the operation (operation 1) of the digital broadcast receiver of the embodiment 1.

FIG. 9 is a flowchart showing a flow of the operation (operation 1) of the digital broadcast receiver of the embodiment 1, which shows the control processing of the operating point of the RF AGC and the individual time constants of the AGC of the RF and IF. First, the interfering wave influence degree decision unit 20 decides the deterioration in the receiving performance due to the interfering wave as described above (step ST1), and notifies the micro 23 of the decision result. In this case, unless the deterioration in the receiving performance is present (NO at step ST1), the micro 23 terminates the processing.

On the other hand, when confirming the deterioration in the receiving performance due to the interfering wave (YES at step ST1), the micro 23 executes control (1) (step ST2), and assigns the state after executing the control (1) as a state A (step ST3).

The control (1) corresponds to one of the three control modes such as executing control A, executing control B, and executing control C after executing the control B.

(a) Control A

Figure 10:
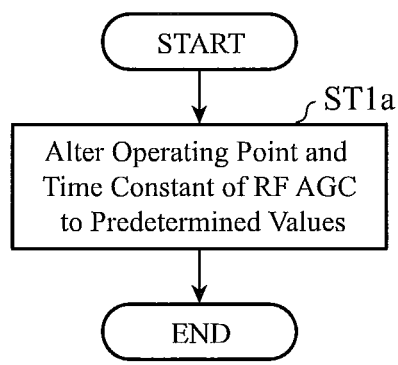
FIG. 10 is a flowchart showing a flow of control A.

FIG. 10 is a flowchart showing a flow of the control A.

In the control A, when the interfering wave influence degree decision unit 20 confirms the deterioration in the receiving performance due to the interfering wave, the micro 23 alters the operating point of the RF AGC amplifier 6 and the time constant of the RF AGC at attack or release to predetermined values (step ST1a).

Here, the term "predetermined values" refers to a prescribed AGC operation level and a time constant of the AGC. For example, a previously set value that improves the receiving performance is held and used.

Incidentally, at step ST1a, the time constants of the AGC can be each altered separately at the attack and release.

(b) Control B

Figure 11:
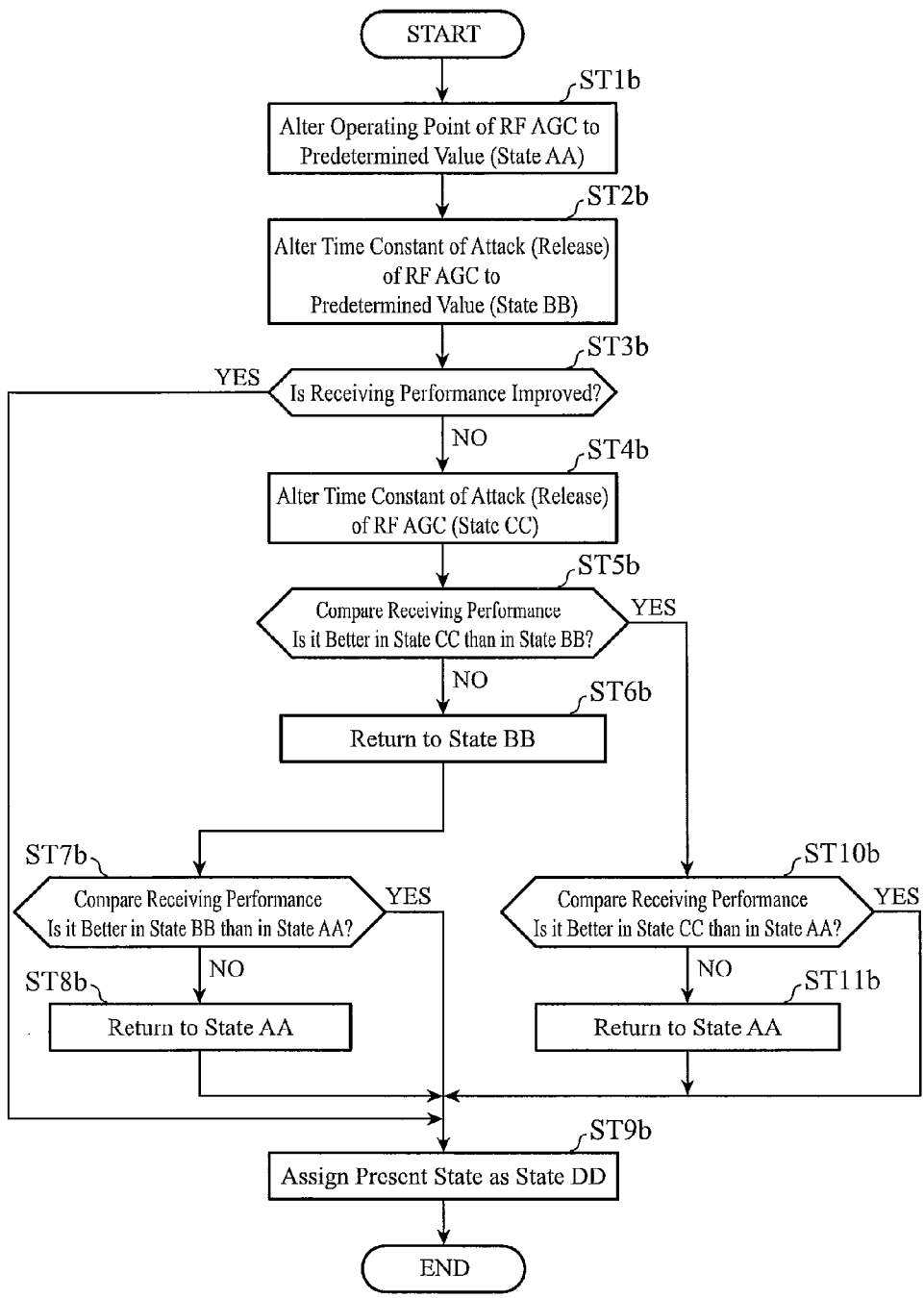
FIG. 11 is a flowchart showing a flow of control B.

FIG. 11 is a flowchart showing a flow of the control B.

First, when the interfering wave influence degree decision unit 20 confirms the deterioration in the receiving performance due to the interfering wave, the micro 23 alters the operating point of the RF AGC amplifier 6 to a predetermined value (step ST1b). This state is referred to as a state AA. Next, the micro 23 alters the time constant of the RF AGC at attack or release to a predetermined value (step ST2b). This state is referred to as a state BB.

After a fixed period has elapsed, the interfering wave influence degree decision unit 20 acquires, according to an instruction from the micro 23, the detection result of the interfering wave by the interfering wave detecting unit 17, the detection result of the C/N detecting unit 18 and the detection result of the error detecting unit 19 as receiving performance decision data, and decides on whether the receiving performance is improved or not from the receiving performance decision data (step ST3b). If the receiving performance is improved (YES at step ST3b), the processing proceeds to step ST9b. At step ST9b, the micro 23 assigns the present state as a state DD, and terminates the processing.

On the other hand, unless the receiving performance is improved (NO at step ST3b), the micro 23 alters the time constant of the RF AGC at attack or release, again, using a prescribed variation (step ST4b). For example, when it has altered the time constant to a faster time constant to achieve the state BB, it alters it to a slower time constant, but when it has altered the time constant to a slower time constant, it alters to a faster time constant. This state is referred to as a state CC.

Next, the interfering wave influence degree decision unit 20 decides on whether the receiving performance is better in the state CC than in the state BB or not (step ST5b).

For example, the interfering wave influence degree decision unit 20 acquires the receiving performance data in the state BB and retains it. Subsequently, when the micro 23 alters the time constant and the state becomes the state CC, the interfering wave influence degree decision unit 20 acquires the receiving performance decision data in the state CC, and decides on whether the receiving performance is improved or not by comparing it with the receiving performance decision data in the state BB retained previously. The interfering wave influence degree decision unit 20 notifies the micro 23 of the decision result.

When the state BB has better receiving performance (NO at step ST5b), the micro 23 returns the time constant of the RF AGC at attack or release to the value set in the state BB (step ST6b).

At step ST7b, the interfering wave influence degree decision unit 20 decides on whether the receiving performance is better in the state BB than in the state AA or not, and notifies the micro 23 of the decision result.

Here, if the receiving performance is better in the state AA (NO at step ST7b), the micro 23 returns the time constant of the RF AGC at attack or release to the value set in the state AA (step ST8b). In contrast, if the receiving performance is better in the state BB (YES at step ST7b), the processing proceeds to step ST9b. At step ST9b, the micro 23 assigns the present state as the state DD and terminates the processing.

On the other hand, if the receiving performance is better in the state CC than in the state BB (YES at step ST5b), the interfering wave influence degree decision unit 20 decides on whether the receiving performance is better in the state CC than in the state AA (step ST10b), and notifies the micro 23 of the decision result.

Here, if the receiving performance is better in the state CC than in the state AA (YES at step ST10b), the processing proceeds to step ST9b.

In contrast, if the receiving performance is better in the state AA (NO at step ST10b), the micro 23 returns the time constant of the RF AGC at attack or release to the value set in the state AA (step ST11b). After that, the processing proceeds to step ST9b.

Incidentally, at step ST2b, step ST4b, step ST6b, step ST8b and step ST11b, the time constant of the AGC can be varied separately at the attack and at the release.

(c) Control B→Control C

If receiving deterioration due to the interfering wave remains after completing the control B, the processing proceeds to the control C.

Figure 12:
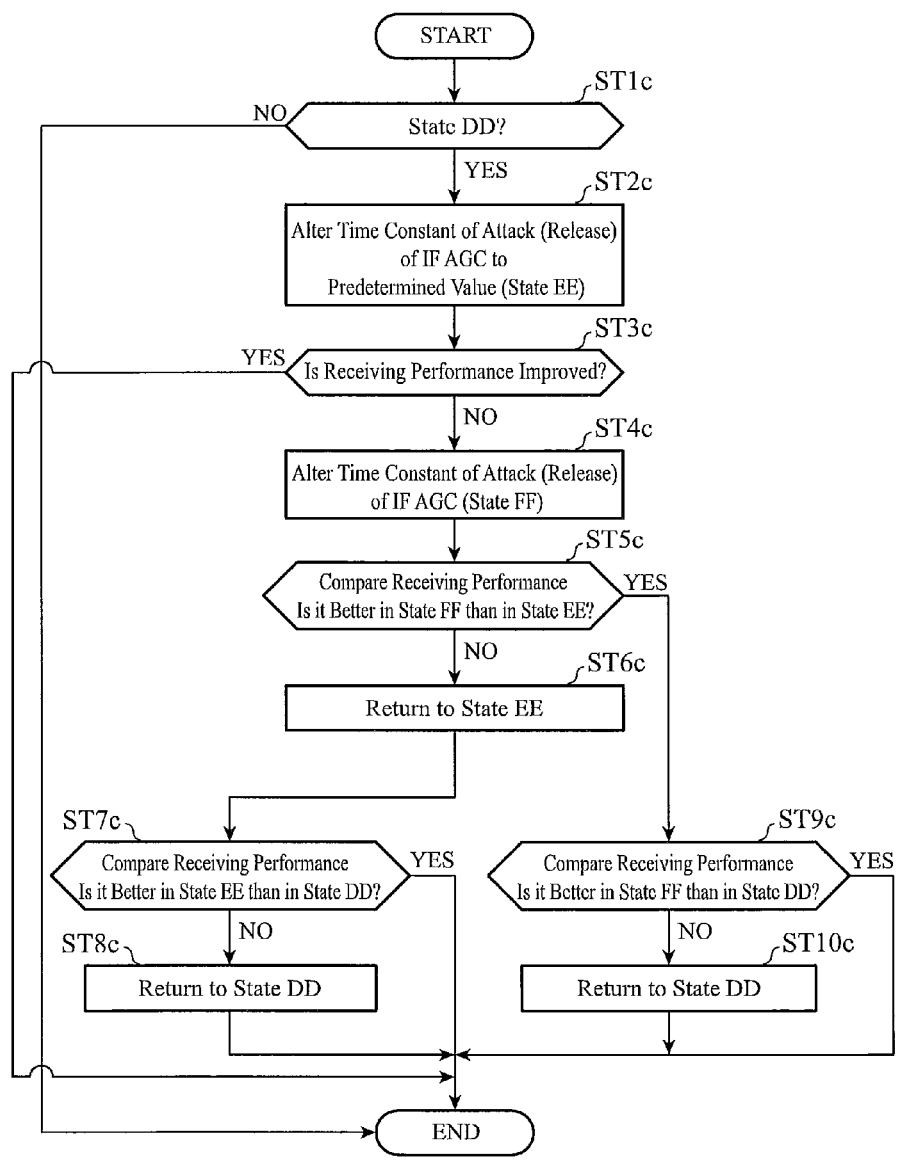
FIG. 12 is a flowchart showing a flow of control C.

FIG. 12 is a flowchart showing a flow of the control C.

First, the micro 23 decides on whether the present state is the state DD or not from the AGC operation level of the RF AGC amplifier 6 and the time constant of the RF AGC (step ST1c). Unless it is the state DD (NO at step ST1c), it terminates the processing.

In contrast, if it is the state DD (YES at step ST1c), the micro 23 alters the time constant of the IF AGC at attack or release to a predetermined value (step ST2c). The state is referred to as a state EE.

After a prescribed period has elapsed, the interfering wave influence degree decision unit 20 acquires, according to an instruction from the micro 23, the detection result of the interfering wave by the interfering wave detecting unit 17 based on the signal level detection result of the RF level detecting unit 11 and the signal level detection result of the IF level detecting unit 16 or on the FFT processing result of the FFT unit 13, the detection result of the C/N detecting unit 18, and the detection result of the error detecting unit 19, and decides from these receiving performance data as to whether the receiving performance is improved or not (step ST3c). If the receiving performance is improved (YES at step ST3c), the micro 23 terminates the processing.

On the other hand, unless the receiving performance is improved (NO at step ST3c), the micro 23 alters the time constant of the IF AGC at attack or release, again, using a prescribed variation (step ST4c). For example, when it has altered the time constant to a faster time constant to achieve the state EE, it alters it to a slower time constant, but when it has altered the time constant to a slower time constant, it alters to a faster time constant. This state is referred to as a state FF.

Next, the interfering wave influence degree decision unit 20 decides on whether the receiving performance is better in the state FF than in the state EE or not (step ST5c), and notifies the micro 23 of the decision result.

Here, if the state EE has better receiving performance (NO at step ST5c), the micro 23 returns the time constant of the IF AGC at attack or release to the value set in the state EE (step ST6c).

At step ST7c, the interfering wave influence degree decision unit 20 decides on whether the receiving performance is better in the state EE than in the state DD or not, and notifies the micro 23 of the decision result.

Here, if the receiving performance is better in the state DD (NO at step ST7c), the micro 23 returns the time constant of the IF AGC at attack or release to the value set in the state DD (step ST8c). In contrast, if the receiving performance is better in the state EE (YES at step ST7c), the micro 23 terminates the processing.

If the receiving performance is better in the state FF than in the state EE (YES at step ST5c), the interfering wave influence degree decision unit 20 decides on whether the receiving performance is better in the state FF than in the state DD (step ST9c), and notifies the micro 23 of the decision result.

Here, if the receiving performance is better in the state FF than in the state DD (YES at step ST9c), the micro 23 terminates the processing.

In contrast, if the receiving performance is better in the state DD (NO at step ST9c), the micro 23 returns the time constant of the IF AGC at attack or release to the value set in the state DD (step ST10c). After that, the micro 23 terminates the processing.

Incidentally, at step ST2c, step ST4c, step ST6c, step ST8c and step ST10c, the time constant of the AGC can be varied separately at the attack and at the release.

Depending on variations of radio environment, there are some cases where the receiving performance is improved by returning the operating point of the RF AGC amplifier 6 and the individual time constants of the AGC of the RF and IF, which are altered by the foregoing processing, to their initial values.

Accordingly, the digital broadcast receiver 1 of the embodiment 1 carries out the processing of returning the values altered in the processing of FIG. 9 to the initial values as follows.

Figure 13:
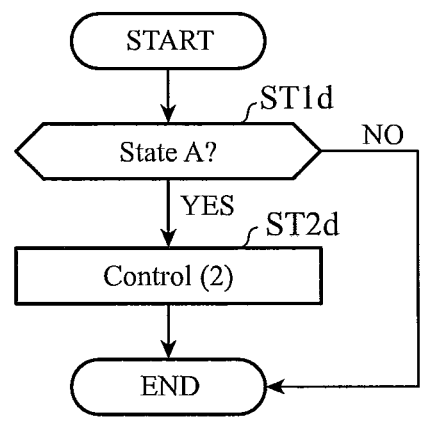
FIG. 13 is a flowchart showing a flow of the operation (operation 2) of the digital broadcast receiver of the embodiment 1.

FIG. 13 is a flowchart showing a flow of the operation (operation 2) by the digital broadcast receiver of the embodiment 1, which shows the processing of returning the operating point of the RF AGC and the individual time constants of the AGC of the RF and IF to their initial values.

First, the micro 23 decides on whether the present state is the state A set in FIG. 9 or not from the AGC operation level and time constant set to the AGC amplifier 6 or 10 (step ST1d). Here, unless it is the state A (NO at step ST1c), the micro 23 terminates the processing.

In contrast, if it is the state A (YES at step ST1d), the micro 23 executes the control (2) (step ST2d), and terminates the processing.

The control (2) corresponds to the following control D or control E.

(d) Control D

Figure 14:
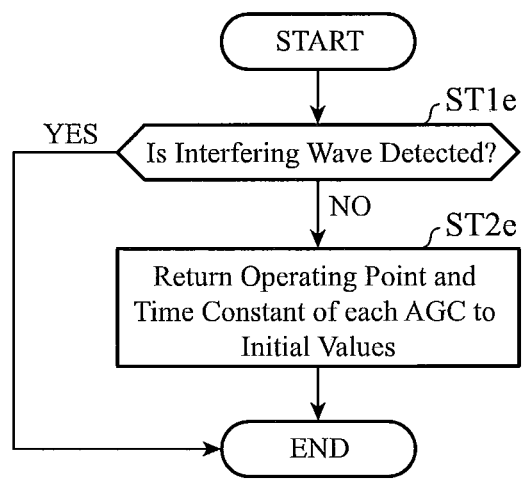
FIG. 14 is a flowchart showing a flow of control D.

FIG. 14 is a flowchart showing a flow of the control D.

The micro 23 inquires of the interfering wave influence degree decision unit 20 whether the interfering wave detecting unit 17 detects an interfering wave or not in the present state (state A) (step ST1*e*).

Here, when it detects the interfering wave (YES at step ST1*e*), the micro 23 terminates the processing.

In contrast, unless it has detected the interfering wave (NO at step ST1*e*), the micro 23 returns the operating point of the RF AGC amplifier 6 and the time constants of the AGC of the RF and IF at the attack or release to their initial values before the processing of FIG. 9 (step ST2*e*), and terminates the processing.

(e) Control E

Figure 15:
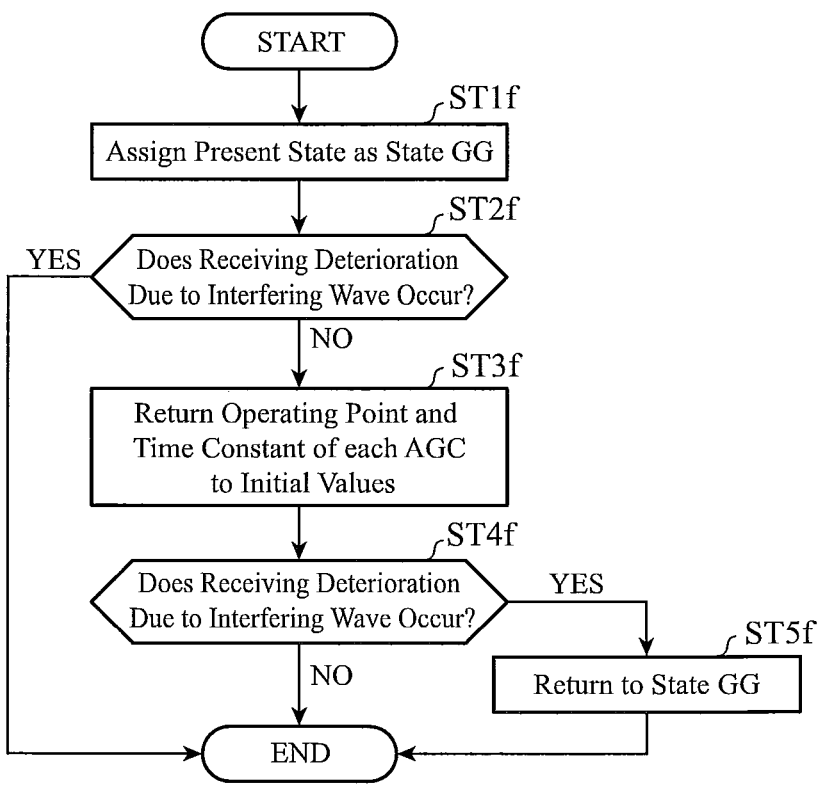
FIG. 15 is a flowchart showing a flow of control E.

FIG. 15 is a flowchart showing a flow of control E.

First, the micro 23 assigns the present state (state A) as a state GG, and retains the operating point of the RF AGC amplifier 6 and the time constants of the AGC of the RF and IF at the attack or release (step ST1*f*).

Next, according to an instruction from the micro 23, the interfering wave influence degree decision unit 20 decides on whether the receiving performance has any deterioration due to the interfering wave or not (step ST2*f*). Here, if the receiving performance has deterioration due to the interfering wave (YES at step ST2*f*), the micro 23 decides that the deterioration in the receiving performance has been improved in the present state GG and terminates the processing.

On the other hand, if the deterioration in the receiving performance due to the interfering wave has been eliminated (NO at step ST2*f*), the micro 23 returns the operating point of the RF AGC amplifier 6 and the time constants of the AGC of the RF and IF at the attack or release to their initial values (step ST3*f*).

After that, according to the instruction from the micro 23, the interfering wave influence degree decision unit 20 decides on whether the receiving performance has deterioration due to the interfering wave or not (step ST4*f*).

Here, unless any deterioration in the receiving performance due to the interfering wave occurs (NO at step ST4*f*), the micro 23 terminates the processing.

In contrast, if further deterioration in the receiving performance due to the interfering wave occurs (YES at step ST4*f*), the micro 23 makes a decision that the receiving performance was better in the state GG, returns the operating point of the RF AGC amplifier 6 and the individual time constants of the AGC of the RF and IF to the values set in the state GG (step ST5*f*), and terminates the processing.

As described above, when the radio environment varies while carrying out each of the control A, B and C, there is a possibility that the influence of the interfering wave is reduced and the receiving performance becomes better when the operating point of the RF AGC amplifier 6 and the individual time constants of the AGC of the RF and IF have their initial values.

Accordingly, a configuration is possible which returns the operating point of the AGC and the time constants to their initial values at any given intervals, compares with the present settings, and returns to their initial values when the receiving performance is improved by the initial values.

In addition, if the receiving performance is deteriorated by a sudden interfering wave such as incoming noise, there is a danger that the operating point and time constants of the AGC are erroneously altered even if the receiving performance is good originally.

Thus, a configuration is possible which has a guard function added for controlling the operating point and time constant of the AGC only when the deterioration in the receiving performance is detected for a fixed time period or when the degree of the receiving deterioration increases with time or the like.

As described above, according to the present embodiment 1, it comprises the RF AGC amplifier 6 for amplifying, with its gain being controlling, the RF signal in the desired frequency band extracted from RF signals of the digital broadcasting wave; the 1st Mixer 7 and 2nd Mixer 9 for carrying out frequency conversion of the output signal of the RF AGC amplifier 6 to the IF signal in the desired intermediate frequency band; the IF AGC amplifier 10 for amplifying, with its gain being controlling, the frequency converted IF signal; the interfering wave detecting unit 17 for detecting the interfering wave other than the desired wave signal in the digital broadcasting wave; the C/N detecting unit 18 and error detecting unit 19 that constitute the information acquiring unit for acquiring the information indicating the receiving state of the digital broadcasting wave; the interfering wave influence degree decision unit 20 for deciding, when the interfering wave detecting unit 17 detects the interfering wave, the presence or absence of the receiving performance deterioration in the digital broadcasting wave due to the interfering wave from the information fed from the C/N detecting unit 18 and error detecting unit 19; and the micro 23 for altering, when the interfering wave influence degree decision unit 20 decides that the receiving performance deterioration of the digital broadcasting wave is present, the operating point of the RF AGC amplifier 6 and the time constant of the gain control in the RF AGC amplifier 6. With such a configuration, it can improve the deterioration in the receiving performance due to the interfering wave. In addition, even if fluctuations in the received signal level due to fading or the like occur, since it can adjust the gain to a level appropriate for the post-stage circuit to process, it can reduce the deterioration in the receiving performance due to the interfering wave and fading.

In addition, according to the present embodiment 1, when the receiving performance deterioration decided by the interfering wave influence degree decision unit 20 is not improved for more than a fixed time period after the micro 23 alters the operating point of the RF AGC amplifier 6 and the time constant of the gain control, the micro 23 alters the time constant of the gain control in the RF AGC amplifier 6 again in such a manner as to improve the receiving performance deterioration. Accordingly, it can set an appropriate time constant.

Furthermore, according to the present embodiment 1, when the interfering wave influence degree decision unit 20 decides that the receiving performance deterioration is present, the micro 23 alters the time constant of the gain control in the IF AGC amplifier 10 after it alters the operating point of the RF AGC amplifier 6 and the time constant of the gain control thereof. Accordingly, it can improve the deterioration in the receiving performance due to the interfering wave.

Moreover, according to the present embodiment 1, as for the attack which refers to the gain control through which the micro 23 adjusts the RF signal or IF signal with a level fluctuating beyond a prescribed signal level to the prescribed signal level and as for the release which refers to the gain control through which the micro 23 adjusts the RF signal or IF signal with a level fluctuating below a prescribed signal level to the prescribed signal level, it can set appropriate time constants in accordance with the attack and release because the micro 23 alters the time constants of the gain control separately for the attack and release in the RF AGC amplifier 6 and IF AGC amplifier 10, respectively.

Furthermore, according to the present embodiment 1, when the interfering wave detecting unit 17 has stopped detecting the interfering wave or the interfering wave influence degree decision unit 20 decides that no receiving performance deterioration occurs, the micro 23 returns the operating point of the RF AGC amplifier 6 and the time constants of the gain control of the RF and IF to their values before the alteration (initial values). In particular, unless the deterioration in the receiving performance occurs after returning to the initial values, it maintains the initial values. This enables the present embodiment 1 to set the initial values in such a manner as to maintain the receiving performance.

INDUSTRIAL APPLICABILITY

The digital broadcast receiver in accordance with the present invention can reduce the deterioration in the receiving performance due to the interfering wave and fading. Accordingly, it is suitable for an onboard audio apparatus or the like.

What is claimed is:

1. A digital broadcast receiver comprising:
a radio frequency auto gain control (RF-AGC) amplifier unit that amplifies, with its gain being controlled, an RF signal in a desired frequency band extracted from RF signals of a digital broadcasting wave;
a first frequency converter unit that carries out frequency conversion of an output signal of the RF-AGC amplifier unit to a first IF signal in a first desired intermediate frequency band;
a second frequency converter unit that carries out frequency conversion of the first IF signal to a second IF signal in a second desired intermediate frequency band;
an intermediate frequency auto gain control (IF-AGC) amplifier unit that amplifies, with its gain being controlled, the second IF signal
a detecting unit that detects an interfering wave in the digital broadcasting wave;
an information acquiring unit that acquires information indicating a receiving state of the digital broadcasting wave;
a decision unit that decides, when the detecting unit detects the interfering wave, the presence or absence of receiving performance deterioration in the digital broadcasting wave due to the interfering wave from the information supplied from the information acquiring unit; and
a control unit that alters, when the decision unit decides that the receiving performance deterioration of the digital broadcasting wave is present, an operating point of the RF-AGC amplifier unit and a time constant of gain control in the RF-AGC amplifier unit, wherein
altering the operating point reduces the receiving performance deterioration due to the interfering wave, and altering the time constant reduces the receiving performance deterioration due to fading.

2. The digital broadcast receiver according to claim 1, wherein
the control unit, when the receiving performance deterioration in the digital broadcasting wave decided by the decision unit is not improved for more than a fixed time period after altering the operating point of the RF-AGC amplifier unit and the time constant of the gain control in the RF-AGC amplifier unit, alters the time constant of the gain control in the RF-AGC amplifier unit again to improve the receiving performance deterioration.

3. The digital broadcast receiver according to claim 1, wherein
the control unit, when the decision unit decides that the receiving performance deterioration is present in the digital broadcasting wave, alters a time constant of gain control in the IF-AGC amplifier unit after altering the operating point of the RF-AGC amplifier unit and the time constant of the gain control in the RF-AGC amplifier unit.

4. The digital broadcast receiver according to claim 3, wherein
the control unit alters the time constants of the gain control in the RF-AGC amplifier unit and in the IF-AGC amplifier unit separately for attack and release, respectively, wherein the attack refers to controlling gain of the RF signal and IF signal with a level varying beyond a prescribed signal level in a manner as to take the prescribed signal level, and the release refers to controlling gain of the RF signal and IF signal with a level varying below a prescribed signal level in a manner as to take the prescribed signal level.

5. The digital broadcast receiver according to claim 3, wherein
the control unit, when the detecting unit is no longer detecting the interfering wave or when the decision unit decides that no receiving performance deterioration is present in the digital broadcasting wave, returns the operating point of the RF-AGC amplifier unit and the time constants of the gain control in the RF-AGC amplifier unit and in the IF-AGC amplifier unit to values before alteration.

* * * * *